(12) United States Patent
Shoji et al.

(10) Patent No.: US 10,864,552 B2
(45) Date of Patent: Dec. 15, 2020

(54) PSEUDO FORCE SENSE GENERATION APPARATUS

(71) Applicant: NIPPON TELEGRAPH AND TELEPHONE CORPORATION, Tokyo (JP)

(72) Inventors: Tetsufumi Shoji, Atsugi (JP); Katsuyuki Ochiai, Atsugi (JP); Hiroaki Gomi, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 302 days.

(21) Appl. No.: 16/063,543

(22) PCT Filed: Dec. 22, 2016

(86) PCT No.: PCT/JP2016/088479
§ 371 (c)(1),
(2) Date: Jun. 18, 2018

(87) PCT Pub. No.: WO2017/115729
PCT Pub. Date: Jul. 6, 2017

(65) Prior Publication Data
US 2018/0369865 A1 Dec. 27, 2018

(30) Foreign Application Priority Data
Dec. 28, 2015 (JP) .................... 2015-256426

(51) Int. Cl.
*H04M 19/04* (2006.01)
*B06B 1/04* (2006.01)
(Continued)

(52) U.S. Cl.
CPC .............. *B06B 1/04* (2013.01); *A63F 13/285* (2014.09); *G06F 3/01* (2013.01); *G06F 3/016* (2013.01);
(Continued)

(58) Field of Classification Search
CPC ....... H03H 17/025; G06F 9/4812; B06B 1/04; B06B 1/166; B25J 13/085; B62D 57/032; G06T 17/20
See application file for complete search history.

(56) References Cited

U.S. PATENT DOCUMENTS 8,384,529 B2    2/2013 Sugahara
2012/0232780 A1*  9/2012 Delson ................. A63F 13/803
                                                  701/400
(Continued)

FOREIGN PATENT DOCUMENTS

CN    103620928 A    3/2014
EP    2 902 879 A1   8/2015
(Continued)

OTHER PUBLICATIONS

International Search Report dated Feb. 21, 2017 in PCT/JP2016/088479 filed Dec. 22, 2016.
(Continued)

*Primary Examiner* — Bryan R Perez
(74) *Attorney, Agent, or Firm* — Oblon, McClelland, Maier & Neustadt, L.L.P.

(57) ABSTRACT

A pseudo force sense generation apparatus including a base, and first to nth vibrators that make asymmetrical motions where relative positions of the vibrators to the base are fixed is provided. An ith vibrator included in the first to the nth vibrators is each capable of presenting pseudo force sense in an ith straight-line direction. The pseudo force sense generation apparatus makes a rotary motion centered at a neighborhood of a center of gravity of a system by driving of the vibrators.

5 Claims, 9 Drawing Sheets

(51) Int. Cl.
   *A63F 13/285*   (2014.01)
   *G06F 3/01*   (2006.01)
(52) U.S. Cl.
   CPC ......... *H04M 19/04* (2013.01); *H04M 19/047* (2013.01)

(56) References Cited

U.S. PATENT DOCUMENTS

| | | |
|---|---|---|
| 2015/0209668 A1 | 7/2015 | Obana et al. |
| 2015/0323996 A1* | 11/2015 | Obana ................ A63F 13/2145 345/177 |
| 2018/0050271 A1 | 2/2018 | Obana et al. |
| 2018/0221764 A1 | 8/2018 | Obana et al. |

FOREIGN PATENT DOCUMENTS

| | | |
|---|---|---|
| JP | 2011-183374 A | 9/2011 |
| JP | 2015-225520 A | 12/2015 |
| JP | 2015-225521 A | 12/2016 |

OTHER PUBLICATIONS

T. Amemiya et al., "Buru-Navi3 Gives You a Feeling of Being Pulled", NTT Technical Review, Sep. 2014, vol. 26, No. 9, 5 total pages (with partial English translation).

Office Action dated May 21, 2019 in Japanese Patent Application No. 2017-559169 with English translation (4 pages).

Extended European Search Report dated Mar. 15, 2019 in European Patent Application No. 16881704.7, 8 pages.

* cited by examiner

PSEUDO FORCE SENSE GENERATION APPARATUS

TECHNICAL FIELD

The present invention relates to a technology for making a user perceive pseudo force sense.

BACKGROUND ART

Pseudo force sense generation apparatuses that make a user perceive pseudo force sense via asymmetrical motions of vibrators are known (see Non-patent Literature 1, for instance). For improved usability and availability of a pseudo force sense generation apparatus, it is desirable that the entire apparatus, including vibrators and electronic circuitry for controlling them and the like, is mechanically integrated.

Meanwhile, for appropriate presentation of pseudo force sense, it is desirable that a grip portion of a pseudo force sense generation apparatus to be gripped by the user is vibrated with a desired pattern and amplitude. In a case where the vibrators of the pseudo force sense generation apparatus are fixed with rigid members, however, the entire apparatus has to be moved for vibrating the grip portion with the desired pattern and amplitude, which is not efficient.

To address such an issue, an attempt has been made to mechanically connect the vibrators with an electronic device unit with a non-rigid connecting member so that the vibrators vibrate independently of the electronic device unit (see Patent Literature 1, for instance).

PRIOR ART LITERATURE

Patent Literature

Patent Literature 1: Japanese Patent Application Laid Open No. 2015-225521

Non-Patent Literature

Non-patent Literature 1: Tomohiro Amemiya, Shinya Takamuku, Sho Ito, Hiroaki Gomi, "Buru-Navi3 Gives You a Feeling of Being Pulled", 2014, NTT Technical Review, Vol. 26, No. 9, pp. 23-26.

SUMMARY OF THE INVENTION

Problems to be Solved by the Invention

The apparatus of Patent Literature 1 however cannot vibrate the vibrators sufficiently independently from the electronic device unit and has difficulty in efficiently presenting a desired pseudo force sense.

An object of the present invention is to efficiently present a desired pseudo force sense even when the relative positions of the vibrators to the electronic device unit are fixed.

Means to Solve the Problems

To attain the object, the present invention provides a pseudo force sense generation apparatus including a base, and first to nth vibrators that make asymmetrical motions where relative positions of the vibrators to the base are fixed. An ith vibrator included in the first to the nth vibrators is each capable of presenting pseudo force sense in an ith straight-line direction. The pseudo force sense generation apparatus makes a rotary motion centered at a neighborhood of a center of gravity of a system by driving of the vibrators.

Effects of the Invention

This enables efficient presentation of a desired pseudo force sense even when the relative positions of the vibrators to the electronic device unit are fixed.

DETAILED DESCRIPTION OF THE EMBODIMENTS

Figure 1:
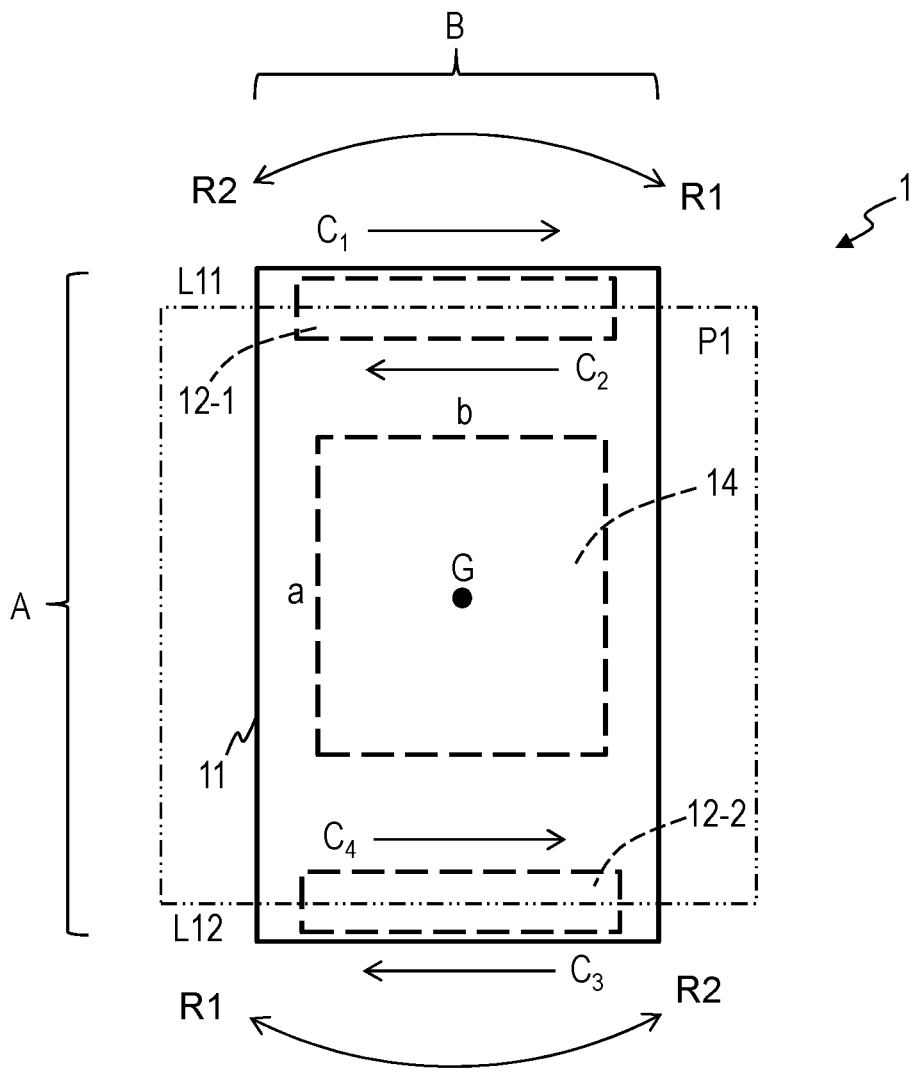
FIG. 1 is a conceptual view of a pseudo force sense generation apparatus in a first embodiment.

Embodiments of the present invention will be now described.

[Overview]

The present invention will be generally described first. A pseudo force sense generation apparatus according to an embodiment has a "base" and first to nth "vibrators" that make asymmetrical motions where relative positions of the vibrators to the "base" are fixed. The ith "vibrator" included in the first to the nth "vibrators" is each capable of presenting pseudo force sense in the ith straight-line direction. n is an integer of two or more, where i=1, . . . , n. The pseudo force sense generation apparatus makes a rotary motion centered at a neighborhood of the center of gravity of a "system" by driving of the "vibrators". A system that makes a rotary motion centered at a neighborhood of the center of gravity has a small inertia moment (rotation moment). Thus, pseudo force sense can be efficiently presented even when the relative positions of the "vibrators" to a certain "electronic device unit" are fixed and the entire system including the "base" and the "vibrators" is moved.

"The ith straight-line direction" is each a straight-line direction along one of the sides of a "virtual polygon" having three or more sides on the same plane, for example. The $n_1$th straight-line direction (where $n_1 \in \{1, \ldots, n\}$) included in the first to the nth straight-line directions is different from the $n_2$th straight-line direction included in the first to the nth straight-line directions (where $n_2 \in \{1, \ldots, n\}$ and $n_2 \neq n_1$). For example, the $n_1$th straight-line direction is a straight-line direction along the $n_1$th side of the "virtual polygon", and the $n_2$th straight-line direction is a straight-line direction along the $n_2$th side (a side different from the $n_1$th side) of the "virtual polygon". For example, the "ith straight-line direction" is a straight-line direction along the ith side among the first to the nth sides that are included in the "virtual polygon" having n or more and three or more sides on the same plane and that are different from each other. Alternatively, two or more straight-line directions included in the first to the nth straight-line directions may be directions along the same side of the "virtual polygon".

A rotary motion caused by driving of the first to the nth "vibrators" is vibration having a rotational component, for example, and can present pseudo rotational force sense of one-degree-of-freedom. A "rotational force sense" means force sense that is perceived as if an object is rotating (that is, pseudo force sense in a rotational direction); for example, it creates pseudo perception of torsion. For example, assume that "the ith straight-line direction" is a straight-line direction along the ith side among the first to the nth sides that are included in a "virtual polygon" having n or more and three or more sides on the same plane and that are different from each other, the "virtual polygon" has the first to the mth vertices (where inn), and of the first to the mth vertices, the $\{((j-1) \bmod in)+1\}$th vertex and the $\{(j \bmod in)+1\}$th vertex are adjacent to each other (where j=1, . . . , m). In other words, each vertex of the "virtual polygon" will be referred to as "the first vertex", "the second vertex", . . . , "the mth vertex" in the order along either one rotational direction. Here, $\alpha \bmod \beta$ represents the remainder (residue) of $\alpha$ divided by $\beta$. It is then assumed that, of the first to the nth "vibrators", at least the kth "vibrator" is capable of presenting pseudo force sense in a direction having a component from the $\{((k-1) \bmod in)+1\}$th vertex toward the $\{(k \bmod in)+1\}$th vertex, and the pth "vibrator" is capable of presenting pseudo force sense in a direction having a component from the $\{((p-1) \bmod in)+1\}$th vertex toward the $\{(p \bmod in)+1\}$th vertex (where k≠p and k, p∈{1, . . . , n}). These force sense presenting directions contain tangential components along a certain rotation, and at least the kth "vibrator" and the pth "vibrator" present these force senses, thereby enabling presentation of force sense including rotational force sense of one-degree-of-freedom as a whole.

The "straight-line direction along side $\alpha$" means any direction on a straight line along the side $\alpha$. Examples of a "straight line along side $\alpha$" include a straight line passing through the side $\alpha$, a straight line running alongside the side $\alpha$, and a straight line parallel or substantially parallel with the side $\alpha$. A "straight line along side $\alpha$" may or may not pass through the side $\alpha$. Although an arrangement in which each ith side passes through each ith "vibrator" is desirable, any ith side may not pass through the ith "vibrator" as long as each ith straight-line direction is a straight-line direction along the ith side. The "virtual polygon" described above is a convex polygon, for example. Examples of the "virtual polygon" include a triangle, a quadrangle, and a pentagon.

The "system" means a system that includes the first to the nth "vibrators". Examples of the "system" include a system composed of the first to the nth "vibrators", a system composed of the "base" and the first to the nth "vibrators", a system composed of the "base", the first to the nth "vibrators", and an "electronic device unit", and a system composed of the "base", the first to the nth "vibrators", an "electronic device unit", and other members. The "neighborhood of the center of gravity" may either be the center of gravity or a vicinity of the center of gravity. An example of the "neighborhood of the center of gravity" is a point that is in a region surrounded by the first to the nth "vibrators" and that is away from the center of gravity at a distance equal to or less than a predetermined value.

The rotary motion centered at a neighborhood of the center of gravity of the "system" caused by driving of "vibrators" may be generated by driving of the first to the nth "vibrators" or by some "vibrators" included in the first to the nth "vibrators".

It is desirable that "the weight distribution of the system" is biased toward a "neighborhood of the center of gravity of the system". This enables clear presentation of pseudo force sense even if the mass of the "system" is large. That "the weight distribution of the system is biased toward a neighborhood of the center of gravity of the system" means that the mass per unit volume, i.e., density, in a "neighborhood of the center of gravity" is greater than the density of the remaining portion. In other words, it means that the density of an area within a predetermined distance from the center of gravity is greater than the density of the other area. For example, the "system" includes an "electronic device unit" having a fixed relative position to the "base" and the "electronic device unit" is arranged in a "neighborhood of the center of gravity of the system" (the region of the "electronic device unit" contains the "neighborhood of the center of gravity of the system"). For example, the "electronic device unit" may be arranged inside the "virtual polygon". The "electronic device unit" includes at least some of a power supply unit (a battery), a power supply circuit, a control circuit for controlling the driving of the vibrators, and a display unit (a device for displaying visual information), for example. As the power supply unit is particularly large in weight, the power supply unit is desirably arranged in a "neighborhood of the center of gravity of the system".

Preferably, the pseudo force sense generation apparatus is configured such that the rotary motion energy of the pseudo force sense generation apparatus in presenting rotational force sense by driving of "vibrators" (the motion energy of the pseudo force sense generation apparatus while making a rotary motion) is smaller than the translational motion energy of the pseudo force sense generation apparatus in presenting translational force sense by driving of "vibrators" (the motion energy of the pseudo force sense generation apparatus while making a translational motion). With a pseudo force sense generation apparatus thus configured, driving power can be smaller when presenting rotational force sense than when presenting translational force sense. The "translational force sense" means force sense that is perceived as if an object is making a translational motion (that is, pseudo force sense in a straight-line direction). For presentation of "translational force sense", control is to be effected so that combination of the presentation directions of pseudo force sense presented by the first to the nth "vibrators" (a combined direction) will be a direction containing a straight line component along the plane (the same plane) on which the aforementioned "virtual polygon" is positioned. The "driving of vibrators" here may be driving of the first to the nth "vibrators" or driving of some "vibrators" included in the first to the nth "vibrators". A "straight line component along a plane" means a directional component along any straight line on the "plane" (a straight line contained by the "plane"). A "directional component along a straight line" means a directional component of either direction on the "straight line".

First Embodiment

A first embodiment will be described. As illustrated in FIG. 1, a pseudo force sense generation apparatus 1 in this embodiment has a base 11, vibrators 12-1, 12-2 that make asymmetrical motions where relative positions of the vibrators to the base 11 are fixed, and an electronic device unit 14.

The base 11 of this embodiment is, for example, a chassis or case having a tablet-shaped appearance and a hollow interior, in which the vibrators 12-1, 12-2 and the electronic device unit 14 are housed. The base 11 is desirably made of a rigid body; however, it does not have to be a rigid body in a strict sense but may be made of any material that can transfer the force generated in the vibrators 12-1, 12-2. For example, the base 11 may be made of synthetic resin such as ABS resin, metal such as copper, glass, wood, rubber, or the like. The base 11 does not have to be made of a single material; a part of an electronic circuit board containing an insulative layer and a conductive layer may be used as the base 11, for example. Also, a housing of an electronic device, such as a mobile phone or a smartphone, or part of the housing may be used as the base 11.

The vibrators 12-1, 12-2 in this embodiment are mechanically fixed inside the base 11. A vibrator 12-$i$ (where i=1, 2) each can make an asymmetrical motion (asymmetrical vibration) along a straight line, thereby presenting pseudo force sense in a desired direction along the straight line. That is, each vibrator 12-$i$ is capable of presenting pseudo force sense (translational force sense) in the ith straight-line direction. Each vibrator 12-$i$ may be the actuator described in Non-patent Literature 1 or any other device that is capable of presenting pseudo translational force sense, for example. A first straight-line direction in this embodiment is straight-line directions $C_1$, $C_2$ along one side L11 of a virtual quadrangle P1 (the virtual polygon), and a second straight-line direction is straight-line directions $C_3$, $C_4$ along a side L12, which is opposite the side L11 of the virtual quadrangle P1. The straight-line directions $C_1$, $C_2$ and the straight-line directions $C_3$, $C_4$ are parallel with each other. For example, the vibrator 12-1 is arranged on the side L11 and the vibrator 12-2 is arranged on the side L12. The virtual quadrangle P1 is positioned on a plane substantially parallel with a plate surface of the base 11 and has a fixed relative position to the base 11.

The electronic device unit 14 is a device including at least some of a power supply unit, a power supply circuit, a control circuit for controlling the driving of the vibrators 12-1, 12-2, and a display unit, for example. The electronic device unit 14 is arranged between the vibrator 12-1 and the vibrator 12-2, and is mechanically fixed inside the base 11 (has a fixed relative position to the base). That is, the electronic device unit 14 is arranged inside the virtual quadrangle P1, and the center of gravity G or its vicinity of the system composed of the pseudo force sense generation apparatus 1 is positioned in the electronic device unit 14. The density of the electronic device unit 14 (the mass per unit volume) is greater than the densities of the other portions including the base 11 and the vibrators 12-1, 12-2. Accordingly, the weight distribution of the system of the pseudo force sense generation apparatus 1 is biased toward a neighborhood of the center of gravity G.

Under control of the electronic device unit 14, the vibrator 12-1 makes periodical asymmetrical vibration that repeats a period during which it applies force in the straight-line direction $C_1$ and a period during which it applies force in the straight-line direction $C_2$. Similarly, under control of the electronic device unit 14, the vibrator 12-2 makes periodical asymmetrical vibration that repeats a period during which it applies force in the straight-line direction $C_3$ and a period during which it applies force in the straight-line direction $C_4$. Both of the vibrators 12-1, 12-2 apply large force for a short time in a direction in which pseudo force sense is to be presented and apply small force for a longer time in the opposite direction.

Here, the vibrator 12-1 is controlled so as to present pseudo force sense in the straight-line direction $C_1$, and the vibrator 12-2 is controlled so as to present pseudo force sense in the opposite direction, that is, the straight-line direction $C_3$. In this case, the pseudo force sense generation apparatus 1 periodically repeats rotation in R1 direction and rotation in R2 direction, that is, the opposite direction (asymmetrical rotation), and the user gripping the pseudo force sense generation apparatus 1 perceives rotational force sense as if the pseudo force sense generation apparatus 1 is rotating in the R1 direction. Conversely, the vibrator 12-1 is controlled so as to present pseudo force sense in the straight-line direction $C_2$ and the vibrator 12-2 is controlled so as to present pseudo force sense in the opposite direction, that is, the straight-line direction $C_4$. In this case, the pseudo force sense generation apparatus 1 periodically repeats rotation in the R2 direction and rotation in the opposite R1 direction, and the user gripping the pseudo force sense generation apparatus 1 perceives rotational force sense as if the pseudo force sense generation apparatus 1 is rotating in the R2 direction. In this embodiment, the center of such a rotary motion is at the center of gravity G or its vicinity. By positioning the center of a rotary motion at the center of gravity G or its vicinity, inertia moment around the rotation center can be minimized or reduced. Specifically, by synchronizing the vibrator 12-1 and the vibrator 12-2 with each other and driving them in antiphase (reverse phases), a clear rotational force sense can be presented.

Alternatively, the vibrator 12-1 is controlled so as to present pseudo force sense in the straight-line direction $C_1$, and the vibrator 12-2 is controlled so as to present pseudo force sense in the straight-line direction $C_4$. In this case, the pseudo force sense generation apparatus 1 makes vibration that periodically repeats movement in the straight-line directions $C_1$, $C_4$ and movement in the opposite straight-line directions $C_2$, $C_3$, and the user gripping the pseudo force sense generation apparatus 1 perceives translational force sense as if the pseudo force sense generation apparatus 1 is moving in the straight-line directions $C_1$, $C_4$. Conversely, the vibrator 12-1 is controlled so as to present pseudo force sense in the straight-line direction $C_2$ and the vibrator 12-2 is controlled so as to present pseudo force sense in the straight-line direction $C_3$. In this case, the pseudo force sense generation apparatus 1 makes vibration that periodically repeats movement in the straight-line directions $C_2$, $C_3$ and movement in the opposite straight-line directions $C_1$, $C_4$, and the user gripping the pseudo force sense generation apparatus 1 perceives translational force sense as if the pseudo force sense generation apparatus 1 is moving in the straight-line directions $C_2$, $C_3$. Specifically, by synchronizing the vibrator 12-1 and the vibrator 12-2 with each other and driving them in phase in the same direction, a clear translational force sense can be presented.

In the configuration of this embodiment, the rotary motion energy of the pseudo force sense generation apparatus 1 in presenting rotational force sense by driving of the vibrators 12-1, 12-2 is smaller than the translational motion energy of the pseudo force sense generation apparatus 1 in presenting translational force sense by driving of the vibrators 12-1, 12-2. In other words, the power required for presenting rotational force sense is smaller than the power required for presenting translational force sense. That is, a configuration that biases the weight distribution of the system of the pseudo force sense generation apparatus 1 toward a neighborhood of the center of gravity G is suited for presenting rotational force sense via a rotary motion centered at a neighborhood of the center of gravity G, and can be driven with smaller power than when presenting translational force sense. This effect is assessed under the following preconditions:

(1) The masses of the base 11 and the vibrators 12-1, 12-2 are ignored.

(2) The outer planar shape of the base 11 is a rectangle of (length, width)=(A, B), where A:B=2:1.

(3) The planar shape of the electronic device unit 14 is a rectangle of (length, width)=(a, b), where A=2a, B=2b, and a:b=2:1. The mass of the electronic device unit 14 is in and its mass distribution is uniform.

(4) Both in presentation of rotational force sense and presentation of translational force sense, the velocity at the ends of the pseudo force sense generation apparatus 1 on the vibrators 12-1, 12-2 sides is v. Also, an angular velocity during presentation of rotational force sense is ω, the radius of gyration is r, and v=rω holds. The motion energy (rotary motion energy) when the pseudo force sense generation apparatus 1 presents rotational force sense via a rotary motion at angular velocity ω is compared with the motion energy (translational motion energy) when the velocity at the ends of the pseudo force sense generation apparatus 1 is v.

(5) In presenting rotational force sense, the vibrator 12-1 and the vibrator 12-2 are driven in antiphase (reverse phases), and in presenting translational force sense, the vibrator 12-1 and the vibrator 12-2 are driven in phase in the same direction.

<When Presenting Rotational Force Sense>

If the center of the electronic device unit 14 is the rotation center, inertia moment I around the rotation center will be as follows, where * represents a multiplication operator:

$$I = m*(a^2+b^2)/12 \quad (1)$$

Since b=a/2, Formula (1) can be approximated as:

$$I = 5*m*a^2/48 \approx 0.1*m*a^2 \quad (2)$$

Thus, rotary motion energy Pr will be:

$$Pr = (I*\omega^2)/2 \quad (3)$$
$$= (0.1*m*a^{2*}\omega^2)/2$$

<When Presenting Translational Force Sense>

As the velocity at one end and the other end of the electronic device unit 14 is v, the translational motion energy Pp of the electronic device unit 14 will be:

$$Pp = m*v^2/2 \quad (4)$$
$$= (m*r^{2*}\omega^2)/2.$$

Thus, from Formulas (3) and (4), the following holds:

$$Pr/Pp = 0.1*a^2/r^2 \quad (5).$$

Here, assuming a=r, the following holds:

$$Pr/Pp = 0.1 \quad (6).$$

It can be seen that under the foregoing preconditions, the power required for presentation of rotational force sense is about one tenth the power required for presentation of translational force sense.

<Features of this Embodiment>

In the pseudo force sense generation apparatus 1, the electronic device unit 14, having a large mass, is fixed at the center, the weight distribution of the system is biased toward a neighborhood of the center of gravity G, and the vibrators 12-1, 12-2 fixed outwardly of it are driven to make a rotary motion centered at a neighborhood of the center of gravity G of the system, thereby presenting rotational force sense. By biasing the weight distribution of the system of the pseudo force sense generation apparatus 1 toward a neighborhood of the center of gravity G, the inertia moment of a rotary motion centered at a neighborhood of the center of gravity G can be reduced. This permits integral mounting of the electronic device unit 14 in the pseudo force sense generation apparatus 1 without decreasing haptic stimulation to the user gripping the external portions (for example, peripheral edges) of the pseudo force sense generation apparatus 1. A desired pseudo force sense (rotational force sense) can be efficiently presented even when the relative positions of the vibrators to the electronic device unit 14 are fixed.

Asymmetrical rotation of the entire pseudo force sense generation apparatus 1 in an integrated manner can give stimulation not only to the fingertips of the user gripping the pseudo force sense generation apparatus 1 but to the palm and the like, creating perception of pseudo force sense with less sense of inconsistency.

Since the electronic device unit 14 is arranged in a neighborhood of the rotation center of the pseudo force sense generation apparatus 1, vibration of the electronic device unit 14 can be reduced so that its reliability and useful life can be improved.

Second Embodiment

Figure 2A:
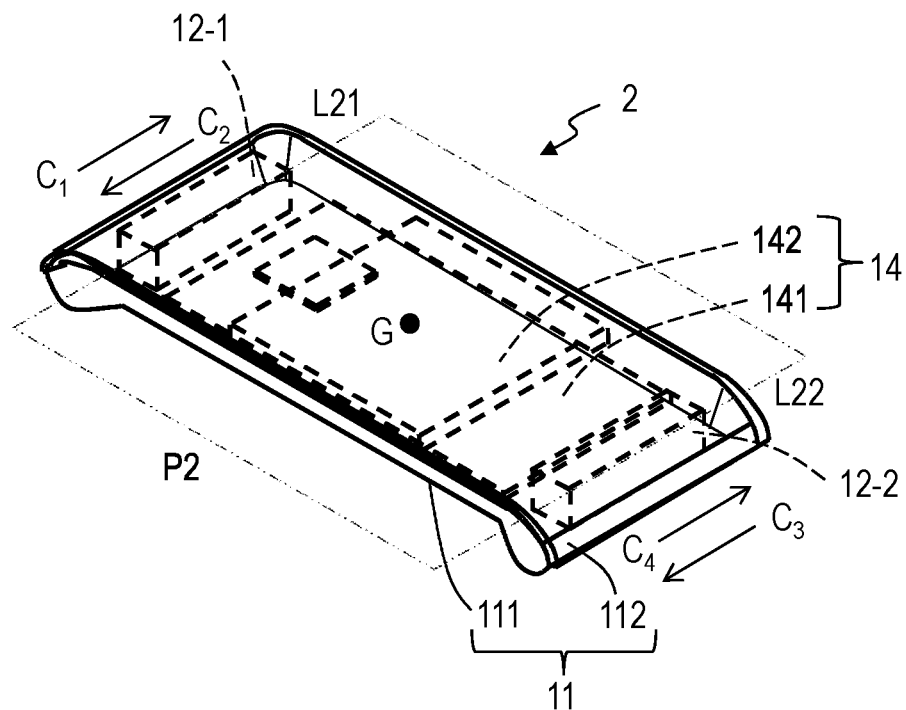
FIG. 2A is a perspective view of the pseudo force sense generation apparatus in a second embodiment.
Figure 3:
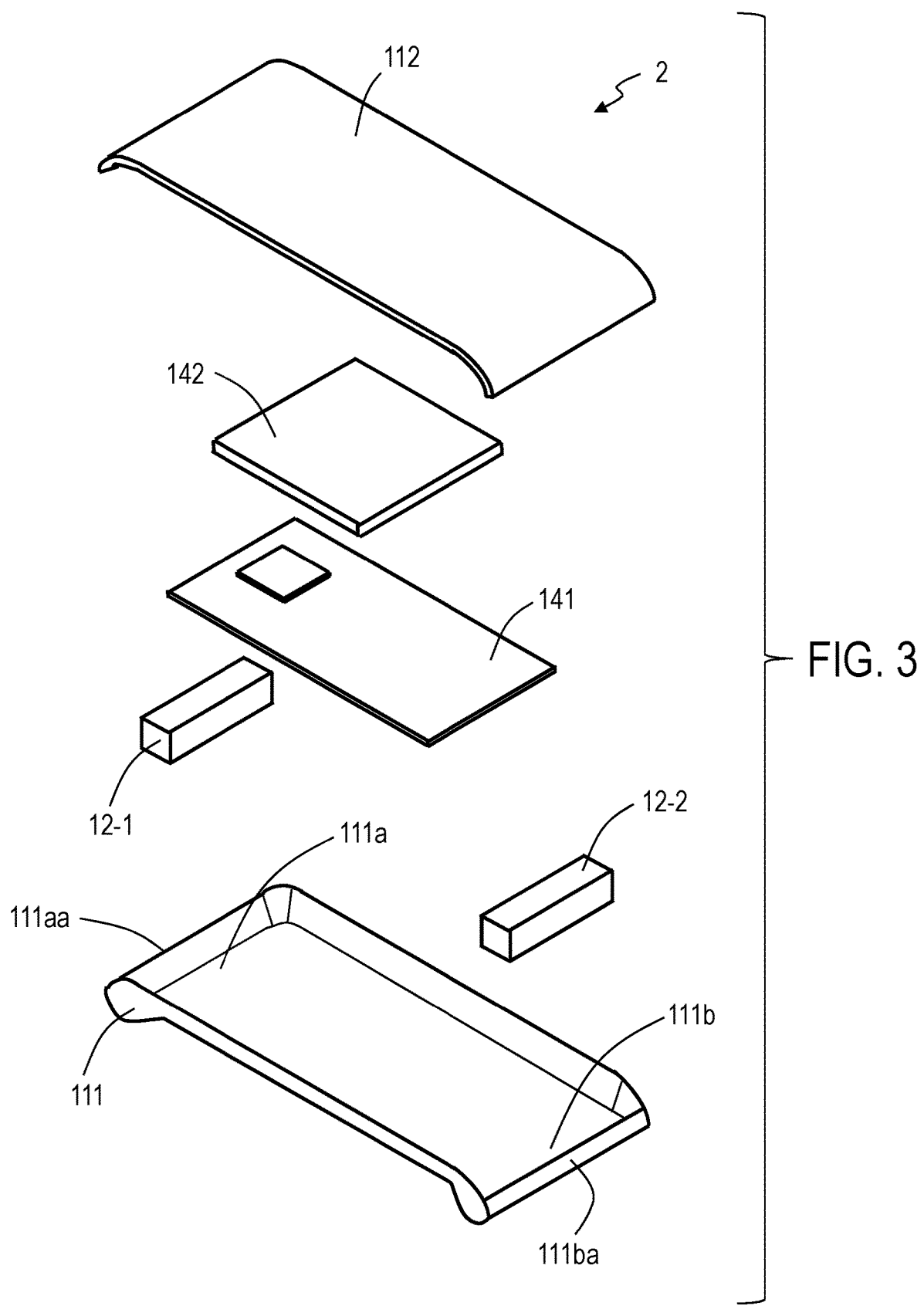
FIG. 3 is an exploded perspective view of the pseudo force sense generation apparatus in the second embodiment.

A second embodiment will be described. This embodiment is a specific example of the first embodiment. Hereinafter, matters already described are denoted with the same reference characters and descriptions on such matters are simplified. As illustrated in FIGS. 2A and 3, a pseudo force sense generation apparatus 2 in this embodiment has the base 11, the electronic device unit 14, and the vibrators 12-1, 12-2. The base 11 has a box-shaped case portion 111 having an open side, and a lid portion 112 to cover the open side. The electronic device unit 14 has a circuit board 141 for controlling the vibrators 12-1, 12-2, and a power supply unit 142.

The inner bottom surface of the case portion 111 is substantially rectangular, the vibrator 12-1 is fixed on the inner bottom surface on the side of one end 111a of the bottom surface in the longitudinal direction, and the vibrator 12-2 is fixed on the inner bottom surface on the side of another end 111b. The vibrator 12-1 presents translational force sense in a direction ($C_1$ or $C_2$) along a rim edge 111aa, which is on the one end 111a side of the case portion 111, via an asymmetrical motion in the direction along the rim edge 111aa. The vibrator 12-2 presents translational force sense in a direction ($C_3$ or $C_4$) along a rim edge 111ba, which is on the other end 111b side of the case portion 111, via an asymmetrical motion in the direction along the rim edge 111ba. That is, the vibrator 12-1 is capable of presenting pseudo force sense in the straight-line direction along a side L21 of a virtual quadrangle P2 having a fixed relative position to the inner bottom surface of the case portion 111. The vibrator 12-2 is capable of presenting pseudo force sense in the straight-line direction along a side L22 of the virtual quadrangle P2 having a fixed relative position to the inner bottom surface of the case portion 111. The side L21 is opposite the side L22 and they are parallel. In a region of the inner bottom surface of the case portion 111 between the vibrator 12-1 and the vibrator 12-2, the circuit board 141 and the power supply unit 142 are fixed. The center of gravity G or its vicinity of the system of the pseudo force sense generation apparatus 2 is positioned in the power supply unit 142 thus arranged.

Figure 4A:
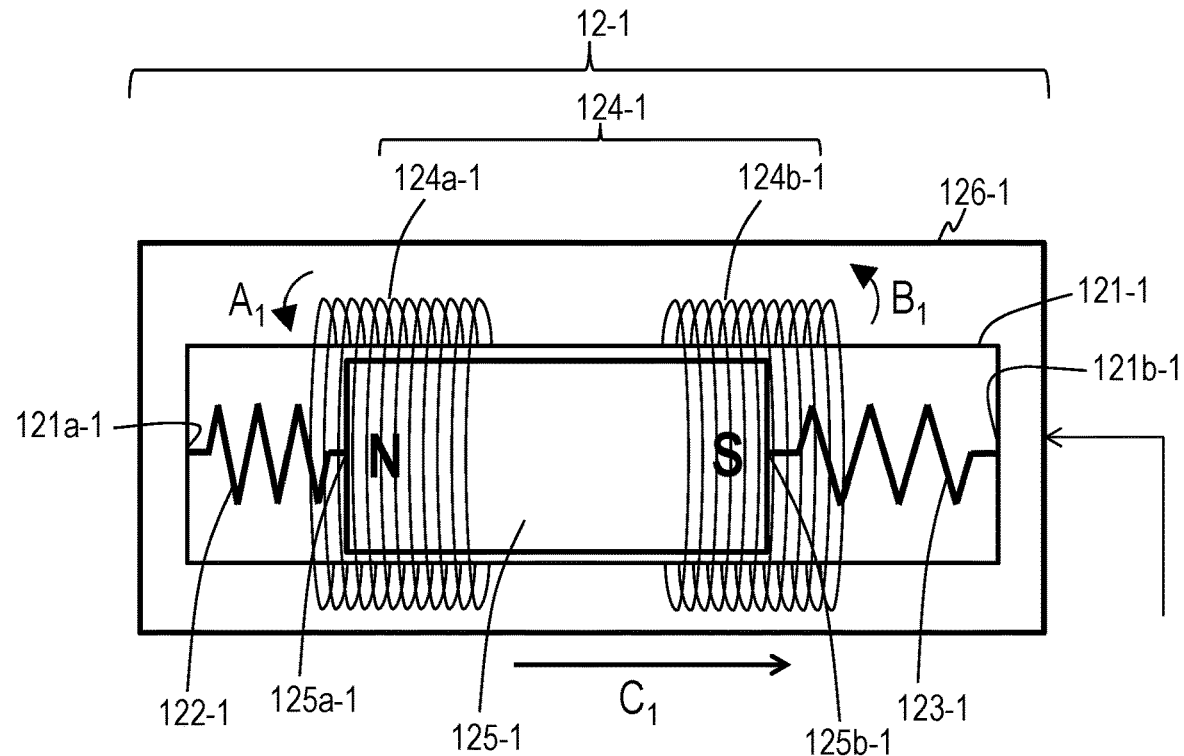
FIG. 4A and FIG. 4B are conceptual views for illustrating a vibrator.
Figure 4B:
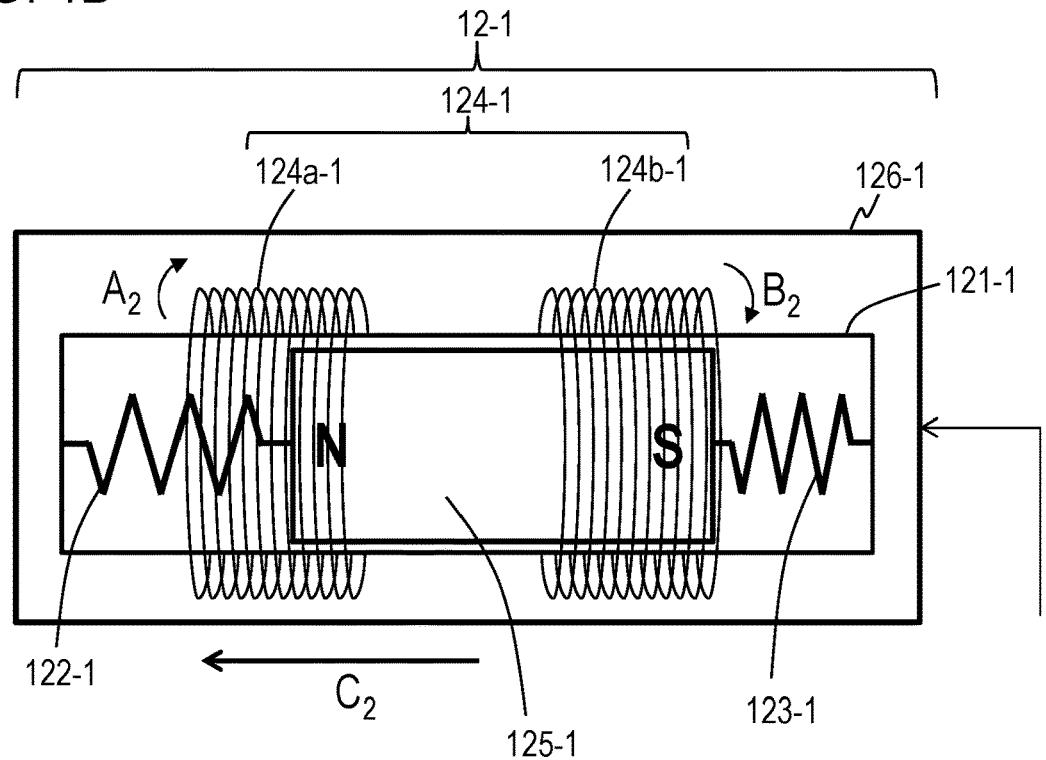

As illustrated in FIGS. 4A and 4B, the vibrator 12-1 has a supporting portion 121-1, springs 122-1, 123-1 (elastic bodies), a coil 124-1, a motion member 125-1, which is a permanent magnet, and a grip portion 126-1 (a case), for example. The grip portion 126-1 and the supporting portion 121-1 in this embodiment are both hollow members shaped in a tube (for example, a cylinder or a polyhedral tube) with its open ends on both sides closed. The supporting portion 121-1 is smaller than the grip portion 126-1 and is sized such that it can be housed in the grip portion 126-1. The grip portion 126-1 and the supporting portion 121-1 are made of synthetic resin such as ABS resin, for example. The springs 122-1, 123-1 are helical springs or leaf springs made of metal or the like, for example. Although the moduli of elasticity (spring constants) of the springs 122-1, 123-1 are desirably the same, they may be different from each other. The motion member 125-1 is a column-shaped permanent magnet, for example, where one end 125$a$-1 side in the longitudinal direction is the N-pole and another end 125$b$-1 side is the S-pole. The coil 124-1 is a string of enameled wire, for example, having a first wound portion 124$a$-1 and a second wound portion 124$b$-1.

The motion member 125-1 is housed inside the supporting portion 121-1 and is supported therein so as to be slidable in the longitudinal direction. Although the details of such a supporting mechanism are not shown, a straight rail along the longitudinal direction is provided on an inner surface wall of the supporting portion 121-1 and a rail supporting portion that slidably supports the rail is provided on a side surface of the motion member 125-1, for example. One end of the spring 122-1 is fixed to an inner surface wall 121$a$-1 of the supporting portion 121-1 on one side in the longitudinal direction (that is, one end of the spring 122-1 is supported on the supporting portion 121-1), while the other end of the spring 122-1 is fixed to an end 125$a$-1 of the motion member 125-1 (that is, the end 125$a$-1 of the motion member 125-1 is supported on the other end of the spring 122-1). One end of the spring 123-1 is fixed to an inner wall surface 121$b$-1 of the supporting portion 121-1 on the other side in the longitudinal direction (that is, one end of the spring 123-1 is supported on the supporting portion 121-1), while the other end of the spring 123-1 is fixed to an end 125$b$-1 of the motion member 125-1 (that is, the end 125$b$-1 of the motion member 125-1 is supported on the other end of the spring 123-1).

On the outer periphery side of the supporting portion 121-1, the coil 124-1 is wound. Here, on the end 125$a$-1 side (the N-pole side) of the motion member 125-1, the first wound portion 124$a$-1 is wound in $A_1$ direction (the direction from the back to the front), while on the end 125$b$-1 side (the S-pole side), the second wound portion 124$b$-1 is wound in $B_1$ direction, the opposite direction to $A_1$ direction (the direction from the front to the back). That is, when seen from the end 125$a$-1 side (the N-pole side) of the motion member 125-1, the first wound portion 124$a$-1 is wound clockwise and the second wound portion 124$b$-1 is wound counter-clockwise. It is also desirable that in a state in which the motion member 125-1 is at rest and the elastic forces from the springs 122-1, 123-1 are balanced, the end 125$a$-1 side (the N-pole side) of the motion member 125-1 is arranged in the region of the first wound portion 124$a$-1 and the end 125$b$-1 side (the S-pole side) is arranged in the region of the second wound portion 124$b$-1.

The supporting portion 121-1, the springs 122-1, 123-1, the coil 124-1, and the motion member 125-1 arranged as described above are housed in the grip portion 126-1, and the supporting portion 121-1 is fixed inside the grip portion 126-1. That is, the relative position of the grip portion 126-1 to the supporting portion 121-1 is fixed. The longitudinal direction of the grip portion 126-1 coincides with the longitudinal direction of the supporting portion 121-1 and the longitudinal direction of the motion member 125-1.

Figure 2B:
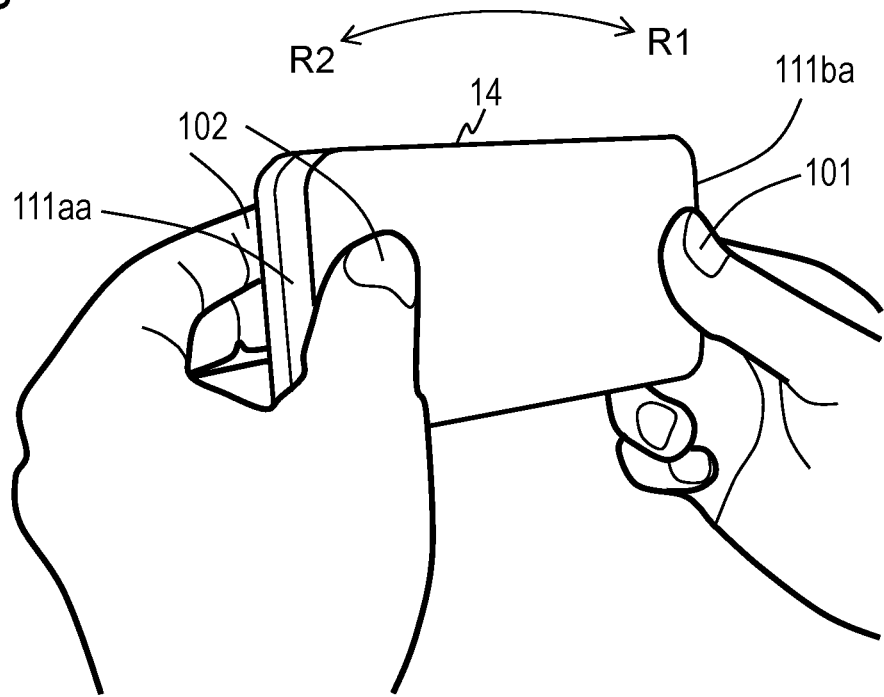
FIG. 2B is a perspective view for describing how the second embodiment is used.

The coil 124-1 applies, to the motion member 125-1, force according to a current being passed in the coil 124-1, thereby causing the motion member 125-1 to make a periodical asymmetrical motion relative to the supporting portion 121-1 (a periodical translational reciprocating motion being asymmetrical in the axial direction with respect to the supporting portion 121-1). That is, when a current is passed through the coil 124-1 in $A_1$ direction ($B_1$ direction), force in $C_1$ direction (the direction from the N-pole to the S-pole of the motion member 125-1: the rightward direction) is applied to the motion member 125-1 (FIG. 2A) due to the reaction of Lorentz force explained by the Fleming's left hand rule. Conversely, when a current is passed through the coil 124-1 in $A_2$ direction ($B_2$ direction), force in $C_2$ direction (the direction from the S-pole to the N-pole of the motion member 125-1: the leftward direction) is applied to the motion member 125-1 (FIG. 2B). Here, the $A_2$ direction is the opposite direction to the $A_1$ direction. These actions give motion energy to the system composed of the motion member 125-1 and the springs 122-1, 123-1. This can change the position and acceleration of the motion member 125-1 with respect to the grip portion 126-1 (the position and acceleration in the axial direction with respect to the supporting portion 121-1).

Here, a first period during which current in a direction that gives the motion member 125-1 an acceleration in a desired direction ($C_1$ direction or $C_2$ direction) is passed through the coil 124-1 and the other, or a second, period are periodically repeated. During the repetition, the ratio (the inversion ratio) between the period (time) during which current is passed in a certain direction and the other period (time) is biased toward either one of the periods. In other words, a periodical current in which the proportion of the first period within a single cycle is different from the proportion of the second period within that cycle is passed through the coil 124-1. This enables presentation of pseudo force sense in a desired direction.

Figure 5A:
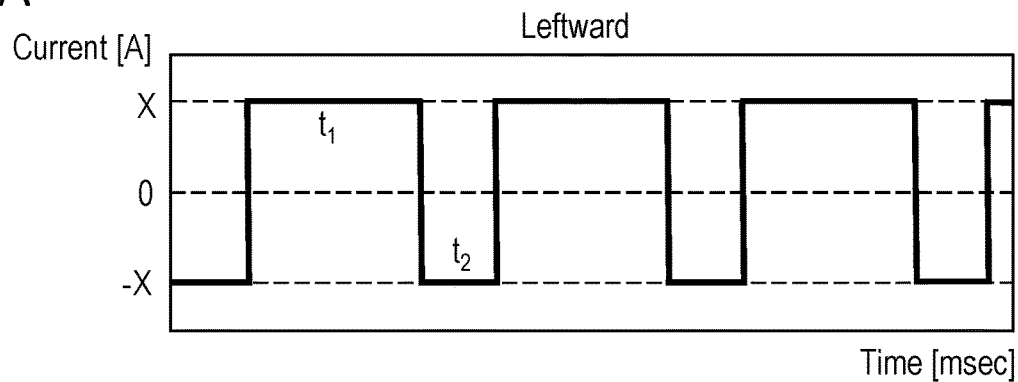
FIGS. 5A to 5D are diagrams for illustrating control for presenting pseudo force sense by vibrators.
Figure 5B:
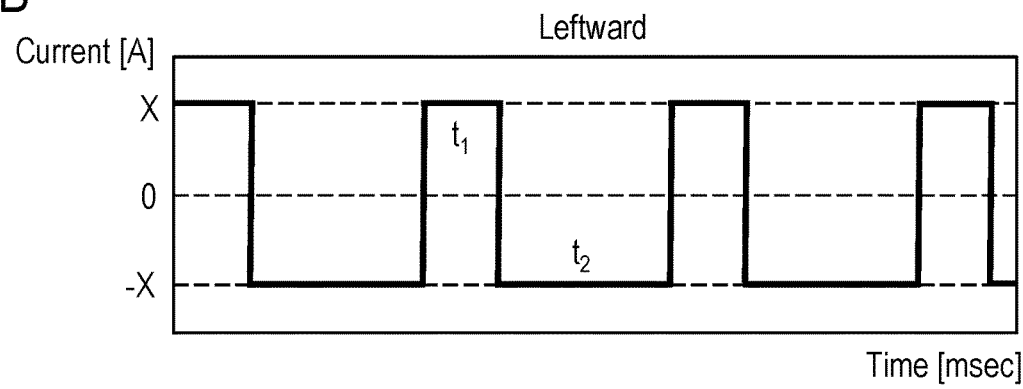

Using FIGS. 5A to 5D, this control will be described. In FIGS. 5A to 5D, the vertical axis represents the current value (current command value) [A] passed through the coil 124-1 and the horizontal axis represents time [msec]. A current value in $A_1$ direction ($B_1$ direction) is represented by a positive value and a current value in $A_2$ direction ($B_2$ direction) is represented by a negative value. FIGS. 5A and 5B are examples that periodically repeat a period $t_1$ (the first period) during which current in $A_1$ direction ($B_1$ direction) (X: current in a direction that gives the motion member 125-1 an acceleration in $C_1$ direction) is passed and a period $t_2$ (the second period) during which current in $A_2$ direction ($B_2$ direction) (−X) is passed. In this case, depending on the ratio between the period $t_1$ during which current in $A_1$ direction ($B_1$ direction) is passed and the period $t_2$ during which current in $A_2$ direction ($B_2$ direction) is passed (the inversion ratio, $t_1$:$t_2$), pseudo force sense in the leftward or the rightward direction in to FIGS. 4A and 4B can be presented. That is, for presentation of pseudo force sense in the leftward direction in FIGS. 4A and 4B, a periodical current with an inversion ratio of $t_1 > t_2$ is passed through the coil 124-1 (FIG. 5A). For example, a periodical current with an inversion ratio of $t_1:t_2=18$ msec:7 msec (current at a frequency of 40 Hz) is passed through the coil 124-1. Conversely, for presentation of pseudo force sense in the rightward direction, a periodical current with an inversion ratio of $t_1 < t_2$ is passed through the coil 124-1 (FIG. 5B). For example, a periodical current with an inversion ratio of $t_1:t_2=7$ msec:18 msec (current at a frequency of 40 Hz) is passed through the coil 124-1.

Figure 5C:
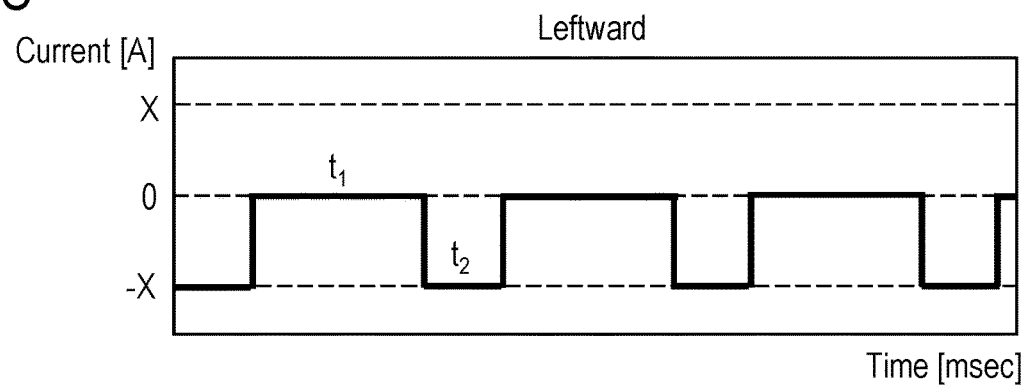
Figure 5D:
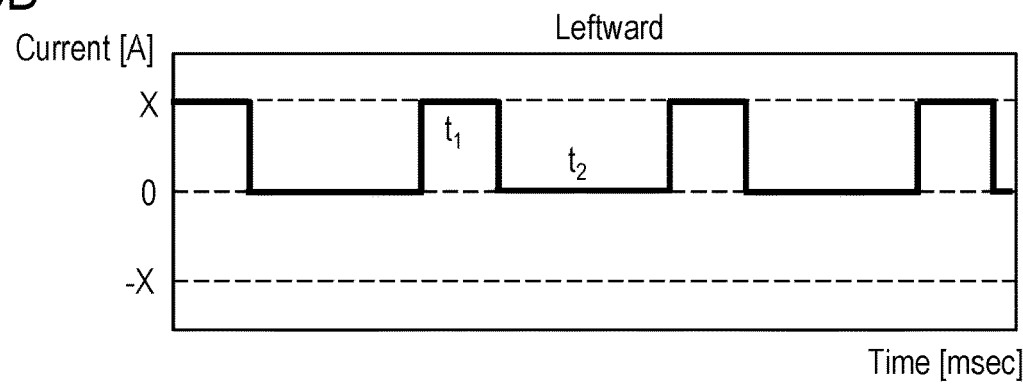

FIGS. 5C and 5D are examples that periodically repeat the period $t_2$ during which current in $A_2$ direction ($B_2$ direction) (−X) is passed and the period $t_1$ during which no current is passed, or periodically repeat the period (time) $t_1$ during which current in $A_1$ direction ($B_1$ direction) (X) is passed and the period $t_2$ during which no current is passed. Here, the inversion ratio $t_1:t_2$ between the period $t_1$ and the period $t_2$ is biased toward either one of the periods. That is, for presentation of pseudo force sense in the leftward direction, a current that periodically repeats the period $t_1$ during which current in $A_2$ direction ($B_2$ direction) (−X: current in a direction that gives the motion member 125-1 an acceleration in $C_2$ direction) and the period $t_2$ during which no current is passed is passed through the coil 124-1. The inversion ratio $t_1:t_2$ of this current is biased toward the period $t_1$, being $t_1 > t_2$ (FIG. 5C). For example, a current with an inversion ratio of $t_1:t_2=18$ msec:7 msec is passed through the coil 124-1. Conversely, for presentation of pseudo force sense in the rightward direction, a current that periodically repeats the period $t_1$ during which current in $A_1$ direction ($B_1$ direction) (X: current in a direction that gives acceleration in $C_1$ direction) is passed and the period $t_2$ during which no current is passed is passed through the coil 124-1. The inversion ratio $t_1:t_2$ of this current is biased toward the period $t_2$, being $t_1 < t_2$ (FIG. 5D). For example, a current with an inversion ratio of $t_1:t_2=7$ msec:18 msec is passed through the coil 124-1.

For the sake of description, the current values (current command values) shown in FIGS. 5A to 5D are rectangular waves. However, the current may have any waveform as long as the current periodically repeats a period during which current is passed in a certain direction and the other period, and the inversion ratio between the period during which current is passed in the certain direction and the other period is biased toward either one of the periods. Also, control may be effected via voltage values instead of via current values. The vibrator 12-2 may have the same configuration as the vibrator 12-1.

As illustrated in FIG. 2B, the user lightly grips the rim edge 111aa side of the pseudo force sense generation apparatus 2 with a left hand 102 and lightly grips the rim edge 111ba side with a right hand 101. Here, as in the first embodiment, the vibrator 12-1 is controlled so as to present pseudo force sense in the straight-line direction $C_1$, and the vibrator 12-2 is controlled so as to present pseudo force sense in the opposite direction, that is, the straight-line direction $C_3$. In this case, the user gripping the pseudo force sense generation apparatus 2 perceives rotational force sense as if the pseudo force sense generation apparatus 2 is rotating in R1 direction. Conversely, the vibrator 12-1 is controlled so as to present pseudo force sense in the straight-line direction $C_2$, and the vibrator 12-2 is controlled so as to present pseudo force sense in the opposite direction, that is, the straight-line direction $C_4$. In this case, the user gripping the pseudo force sense generation apparatus 2 perceives rotational force sense as if the pseudo force sense generation apparatus 2 is rotating in R2 direction. In this embodiment, the center of such a rotary motion is at the center of gravity G or its vicinity. By positioning the center of a rotary motion at the center of gravity G or its vicinity, inertia moment around the rotation center can be minimized or reduced. Alternatively, the vibrator 12-1 is controlled so as to present pseudo force sense in the straight-line direction $C_1$ and the vibrator 12-2 is controlled so as to present pseudo force sense in the straight-line direction $C_4$. In this case, the pseudo force sense generation apparatus 2 makes vibration that periodically repeats movement in straight-line directions $C_1$, $C_4$ and movement in the opposite straight-line directions $C_2$, $C_3$, and the user gripping the pseudo force sense generation apparatus 2 perceives translational force sense as if the pseudo force sense generation apparatus 2 is moving in the straight-line directions $C_1$, $C_4$. Conversely, the vibrator 12-1 is controlled so as to present pseudo force sense in the straight-line direction $C_2$ and the vibrator 12-2 is controlled so as to present pseudo force sense in the straight-line direction $C_3$. In this case, the pseudo force sense generation apparatus 2 makes vibration that periodically repeats movement in the straight-line directions $C_2$, $C_3$ and movement in the opposite straight-line directions $C_1$, $C_4$, and the user gripping the pseudo force sense generation apparatus 2 perceives translational force sense as if the pseudo force sense generation apparatus 2 is moving in the straight-line directions $C_2$, $C_3$.

<Feature of this Embodiment>

This embodiment also achieves the same effect as the first embodiment.

Third Embodiment

A third embodiment will be described. This embodiment is a modification of the first embodiment.

Figure 6A:
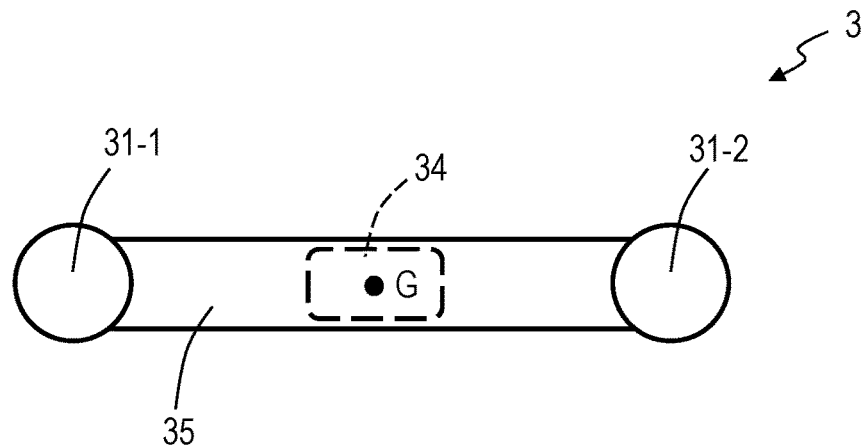
FIGS. 6A and 6B are a plan view and a front view, respectively, of the pseudo force sense generation apparatus in a third embodiment.
Figure 6B:
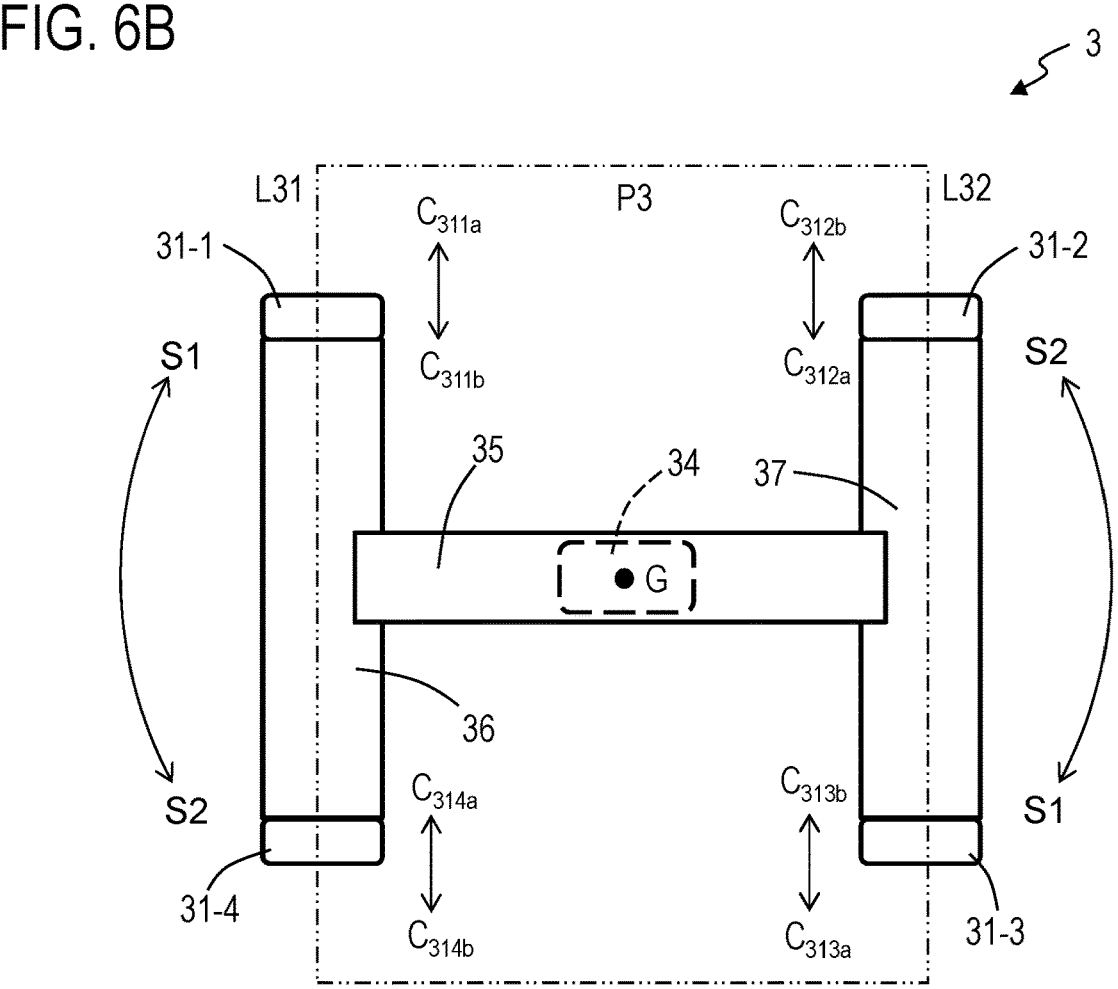

As illustrated in FIGS. 6A and 6B, a pseudo force sense generation apparatus 3 in this embodiment has two grip portions 36, 37 each shaped in a cylinder or column with its both ends closed and having the same length, a cylindrical connector portion 35 (a base) mechanically coupling the central portions of the two grip portions 36, 37, an electronic device unit 34 fixed inside and at the center of the connector portion 35, and vibrators 31-1 to 31-4 respectively fixed at the opposite ends of the grip portions 36, 37. The grip portions 36, 37 are arranged substantially parallel (for example, parallel) with each other, and the connector portion 35 is arranged substantially vertically (for example, vertically) to the grip portions 36, 37. One end of the connector portion 35 is mechanically connected to the central portion of the grip portion 36, and the other end of the connector portion 35 is mechanically connected to the central portion of the grip portion 37. The vibrators 31-1, 31-4 are arranged at orientations that enable them to present pseudo force sense in straight-line directions $C_{311a}$, $C_{311b}$, $C_{314a}$, $C_{314b}$ along the longitudinal direction of the grip portion 36, the vibrator 31-1 being fixed at one end of the grip portion 36 and the vibrator 31-4 being fixed at the other end of the grip portion 36. The vibrators 31-2, 31-3 are arranged at orientations that enable them to present pseudo force sense in straight-line directions $C_{312a}$, $C_{312b}$, $C_{313a}$, $C_{313b}$ along the longitudinal direction of the grip portion 37, the vibrator 31-2 being fixed at one end of the grip portion 37 and the vibrator 31-3 being fixed at the other end of the grip portion 37. The vibrators 31-1, 31-2 are arranged on an upper surface side of the pseudo force sense generation apparatus 3 (on the side of FIG. 6A), and the vibrators 31-3, 31-4 are arranged on a lower surface side of the pseudo force sense generation apparatus 3. The vibrators 31-1, 31-4 are thereby capable of presenting pseudo force sense in the straight-line directions $C_{311a}$, $C_{311b}$, $C_{314a}$, $C_{314b}$, which are along a side L31 of the virtual quadrangle P3 having a fixed relative position to the connector portion 35. The vibrators 31-2, 31-3 are capable of presenting pseudo force sense in the straight-line directions $C_{312a}$, $C_{312b}$, $C_{313a}$, $C_{313b}$, which are along a side L32 of the virtual quadrangle P3 having a fixed relative position to the connector portion 35. The side L31 and the side L32 are parallel with each other. The center of gravity G or its vicinity of the pseudo force sense generation apparatus 3 is positioned within the electronic device unit 34 (the electronic device unit 34 is positioned inside the virtual quadrangle P3), and the weight distribution of the pseudo force sense generation apparatus 3 is biased toward a neighborhood of the center of gravity G.

Assume here that the vibrators 31-1, 31-4 are controlled by the electronic device unit 34 so as to present pseudo force sense in straight-line directions $C_{311a}$, $C_{314a}$ respectively, and the vibrators 31-2, 31-3 are controlled so as to present pseudo force sense in straight-line directions $C_{312a}$, $C_{313a}$ respectively. In this case, the pseudo force sense generation apparatus 3 periodically repeats rotation in the S1 direction and rotation in the opposite S2 direction (asymmetrical rotation), and the user gripping the grip portions 36, 37 perceives rotational force sense as if the pseudo force sense generation apparatus 3 is rotating in the S1 direction. Conversely, assume that the vibrators 31-1, 31-4 are controlled so as to present pseudo force sense in straight-line directions $C_{311b}$, $C_{314b}$ respectively, and the vibrators 31-2, 31-3 are controlled so as to present pseudo force sense in straight-line directions $C_{312b}$, $C_{313b}$ respectively. In this case, the pseudo force sense generation apparatus 3 periodically repeats rotation in the S2 direction and rotation in the opposite S1 direction (asymmetrical rotation), and the user gripping the grip portions 36, 37 perceives rotational force sense as if the pseudo force sense generation apparatus 3 is rotating in the S2 direction. In this embodiment, the center of such a rotary motion is at the center of gravity G or its vicinity. By positioning the center of a rotary motion at the center of gravity G or its vicinity, inertia moment around the rotation center can be minimized or reduced. This achieves the same effect as the first embodiment as well. Alternatively, the vibrators 31-1, 31-2, 31-3, 31-4 are controlled so as to present pseudo force sense in straight-line directions $C_{311a}$, $C_{312b}$, $C_{314a}$, $C_{313b}$ respectively. In this case, the pseudo force sense generation apparatus 3 makes vibration that periodically repeats movement in the straight-line directions $C_{311a}$, $C_{312b}$, $C_{314a}$, $C_{313b}$ and movement in the opposite straight-line direction $C_{311b}$, $C_{312a}$, $C_{314b}$, $C_{313a}$, and the user gripping the pseudo force sense generation apparatus 3 perceives translational force sense as if the pseudo force sense generation apparatus 3 is moving in the straight-line directions $C_{311a}$, $C_{312b}$, $C_{314a}$, $C_{313b}$. Conversely, the vibrators 31-1, 31-2, 31-3, 31-4 are controlled so as to present pseudo force sense in straight-line directions $C_{311b}$, $C_{312a}$, $C_{314b}$, $C_{313a}$ respectively. In this case, the pseudo force sense generation apparatus 3 makes vibration that periodically repeats movement in the straight-line directions $C_{311b}$, $C_{312a}$, $C_{314b}$, $C_{313a}$ and movement in the opposite straight-line directions $C_{311a}$, $C_{312b}$, $C_{314a}$, $C_{313b}$, and the user gripping the pseudo force sense generation apparatus 3 perceives translational force sense as if the pseudo force sense generation apparatus 3 is moving in the straight-line directions $C_{311b}$, $C_{312a}$, $C_{314b}$, $C_{313a}$.

Fourth Embodiment

Figure 7A:
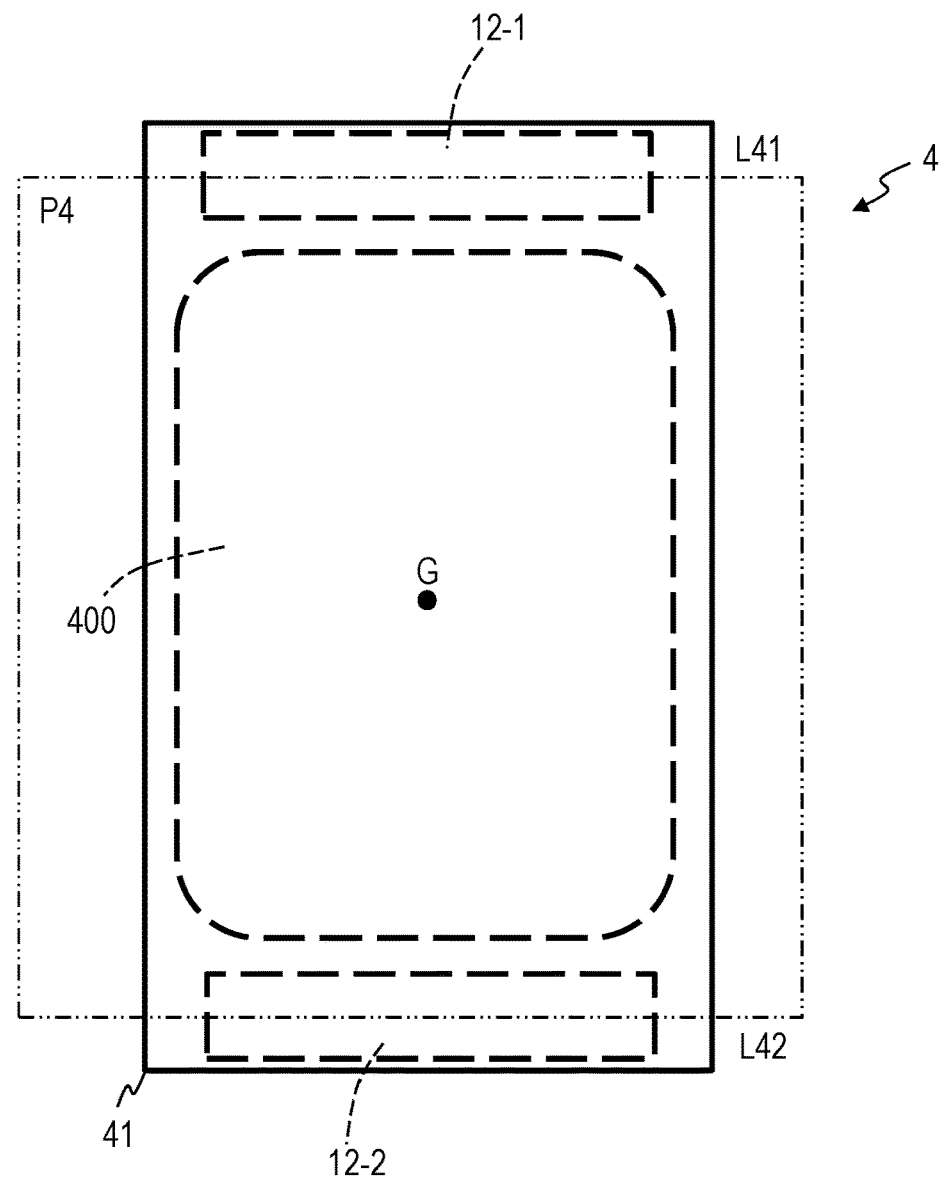
FIG. 7A is a conceptual view of the pseudo force sense generation apparatus in a fourth embodiment.
Figure 7B:
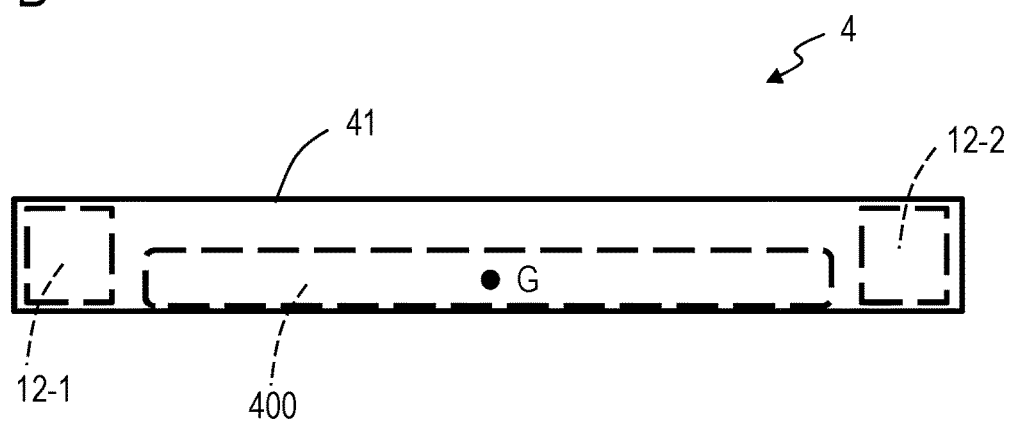
FIG. 7B is a left side view of FIG. 7A.

A fourth embodiment is a modification of the first embodiment and permits attachment and removal of the electronic device unit to/from the pseudo force sense generation apparatus. As illustrated in FIGS. 7A and 7B, a pseudo force sense generation apparatus 4 in this embodiment has a base 41, and vibrators 12-1, 12-2 that make asymmetrical motions where relative positions of the vibrators 12-1, 12-2 to the base 41 are fixed. The base 41 of this embodiment is a case having a tablet-shaped appearance and a hollow interior, in which the vibrators 12-1, 12-2 are mechanically fixed. A vibrator 12-$i$ (where i=1, 2) each can make an asymmetrical motion (asymmetrical vibration) along a straight line, thereby presenting pseudo force sense in a desired direction along the straight line. That is, each vibrator 12-$i$ is capable of presenting pseudo force sense (translational force sense) in the ith straight-line direction. A first straight-line direction in this embodiment is a straight-line direction along one side L41 of a virtual quadrangle P4, and a second straight-line direction is a straight-line direction along a side L42 opposite the side L41 of the virtual quadrangle P4. The virtual quadrangle P4 has a fixed relative position to the base 41. In a region inside the base 41 between the vibrator 12-1 and the vibrator 12-2 (the inner region of the virtual quadrangle P4), an electronic device unit 400 such as a smartphone can be attached. Here, the center of gravity G of the system of the pseudo force sense generation apparatus 4 before attachment of the electronic device unit 400 is present in the region between the vibrator 12-1 and the vibrator 12-2. The center of gravity or its vicinity of the system composed of the electronic device unit 400 and the pseudo force sense generation apparatus 4 after attachment of the electronic device unit 400 is arranged in the electronic device unit 400. The weight distribution of the system composed of the electronic device unit 400 and the pseudo force sense generation apparatus 4 is biased toward a neighborhood of the center of gravity of the system. As in the first embodiment, by driving the vibrators 12-1, 12-2 based on control by the electronic device unit 400, a rotary motion centered at a neighborhood of the center of gravity is generated, making the user gripping the external portions of the pseudo force sense generation apparatus 4 perceive rotational force sense. This can also achieve the same effect as the first embodiment. Such a pseudo force sense generation apparatus 4 is applicable to a smartphone case, for example. Alternatively, the user gripping the external portions of the pseudo force sense generation apparatus 4 may be made perceive translational force sense by controlling the vibrators 12-1, 2 as described in the first and second embodiments.

Fifth Embodiment

Figure 8A:
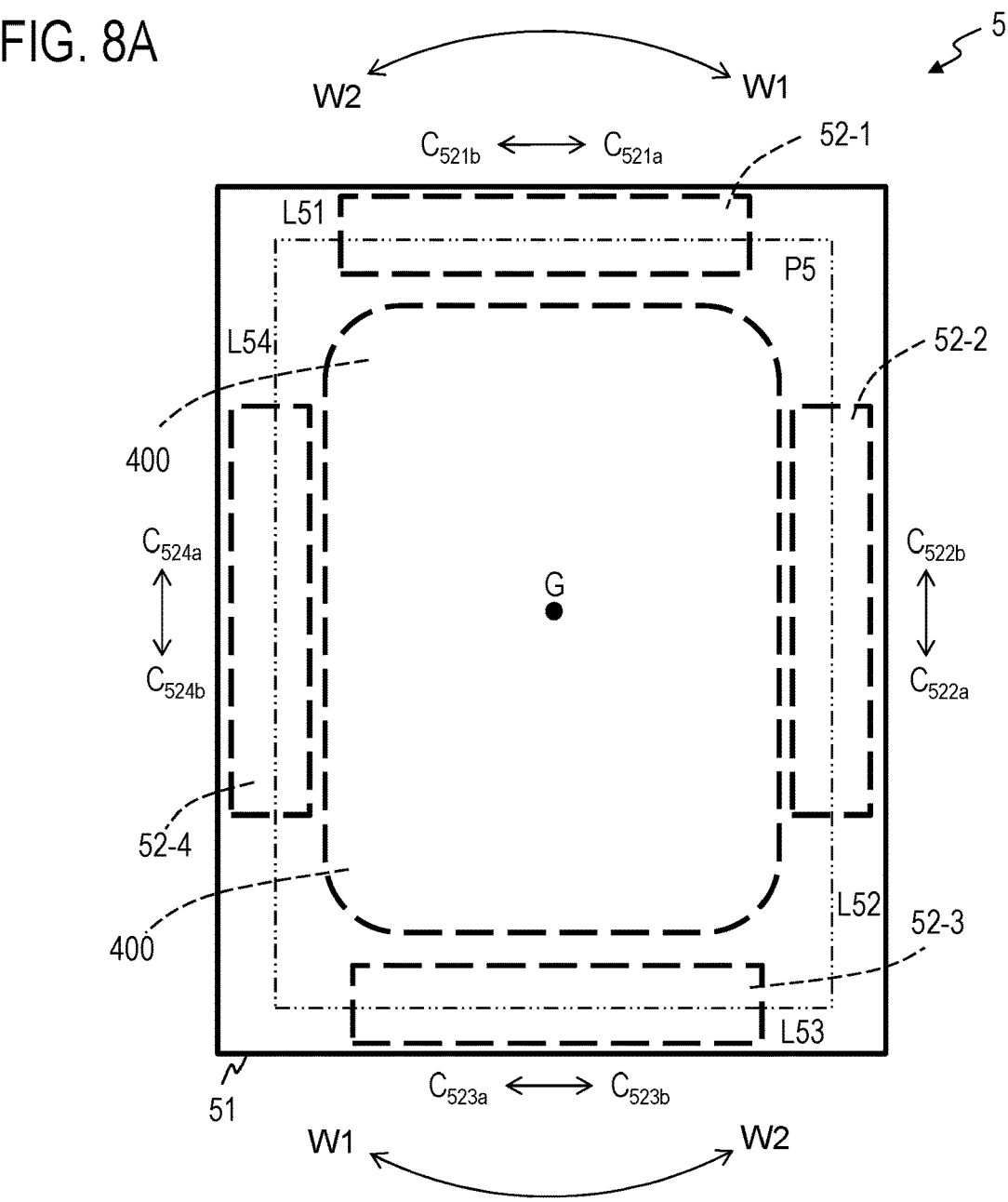
FIG. 8A is a conceptual view of the pseudo force sense generation apparatus in a fifth embodiment.
Figure 8B:
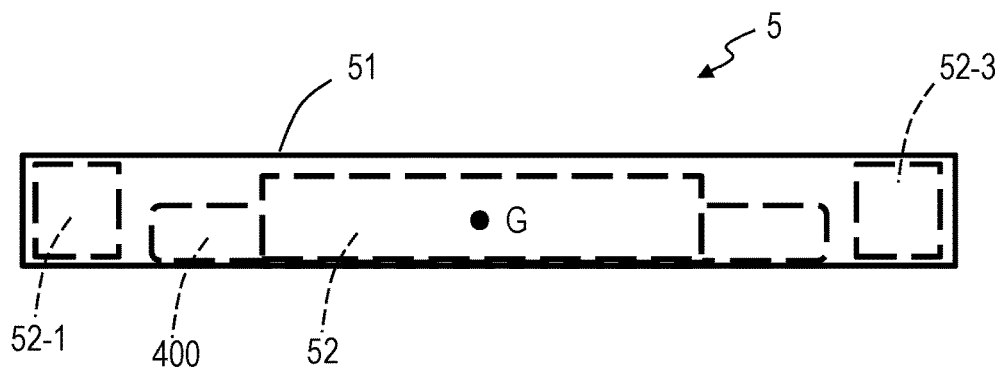
FIG. 8B is a left side view of FIG. 8A.

A fifth embodiment is a modification of the fourth embodiment and differs from it in the number of vibrators. As illustrated in FIGS. 8A and 8B, a pseudo force sense generation apparatus 5 in this embodiment has a base 51, and vibrators 52-1 to 52-4 that make asymmetrical motions where relative positions of the vibrators 52-1 to 52-4 to the base 51 are fixed. The base 51 in this embodiment is a case having a tablet-shaped appearance and a hollow interior, in which the vibrators 52-1 to 52-4 are mechanically fixed. A vibrator 52-$i$ (where i=1 to 4) each can make an asymmetrical motion (asymmetrical vibration) along a straight line, thereby presenting pseudo force sense in a desired direction along the straight line. That is, each vibrator 52-$i$ is capable of presenting pseudo force sense (translational force sense) in the ith straight-line direction. The configuration of each vibrator 52-$i$ is the same as that of the vibrator 12-1 mentioned above, for example. A first straight-line direction in this embodiment is a straight-line direction along one side L51 of a virtual quadrangle P5, a second straight-line direction is a straight-line direction along a side L52 perpendicular to the side L51 of the virtual quadrangle P5, a third straight-line direction is a straight-line direction along a side L53 opposite the side L51 of the virtual quadrangle P5, and a fourth straight-line direction is a straight-line direction along a side L54 opposite the side L52 of the virtual quadrangle P5. The virtual quadrangle P5 has a fixed relative position to the base 51. In a region inside the base 51 surrounded by the vibrators 52-1 to 52-4 (the inner region of the virtual quadrangle P5), the electronic device unit 400 such as a smartphone can be attached. Here, the center of gravity G of the system of the pseudo force sense generation apparatus 5 before attachment of the electronic device unit 400 is present in the region surrounded by the vibrators 52-1 to 52-4. The center of gravity or its vicinity of the system composed of the electronic device unit 400 and the pseudo force sense generation apparatus 5 after attachment of the electronic device unit 400 is arranged in the electronic device unit 400. The weight distribution of the system composed of the electronic device unit 400 and the pseudo force sense generation apparatus 5 is biased toward a neighborhood of the center of gravity of the system.

Assume here that the vibrators 52-1, 52-2, 52-3, 52-4 are controlled by the electronic device unit 400 so as to present pseudo force sense in straight-line directions $C_{521a}$, $C_{522a}$, $C_{523a}$, $C_{524a}$ respectively. In this case, the pseudo force sense generation apparatus 5 periodically repeats rotation in W1 direction and rotation in W2 direction, that is, the opposite direction (asymmetrical rotation), and the user gripping the external portions of the pseudo force sense generation apparatus 5 perceives rotational force sense as if the pseudo force sense generation apparatus 5 is rotating in the W1 direction. Conversely, assume that the vibrators 52-1, 52-2, 52-3, 52-4 are controlled so as to present pseudo force sense in straight-line directions $C_{521b}$, $C_{522b}$, $C_{523b}$, $C_{524b}$ respectively. In this case, the pseudo force sense generation apparatus 5 periodically repeats rotation in the W2 direction and rotation in the opposite W1 direction (asymmetrical rotation), and the user gripping the external portions of the pseudo force sense generation apparatus 5 perceives rotational force sense as if the pseudo force sense generation apparatus 5 is rotating in the W2 direction. In this embodiment, the center of such a rotary motion is at the center of gravity G or its vicinity. By positioning the center of a rotary motion at the center of gravity G or its vicinity, inertia moment around the rotation center can be minimized or reduced. This achieves the same effect as the first embodiment as well. In addition, this embodiment also enables perception of rotational force sense to be created through some of the vibrators 52-1 to 52-4 and perception of translational force sense to be created through other vibrators. In this case, one pair of opposite ones of the vibrators 52-1 to 52-4 may be controlled so as to create perception of rotational force sense and the other pair of vibrators may be controlled so as to create perception of translational force sense. For example, assume that vibrators 52-1, 52-3 are controlled so as to present pseudo force sense in straight-line directions $C_{521a}$, $C_{523a}$ respectively, and vibrators 52-2, 52-4 are controlled so as to present pseudo force sense in straight-line directions $C_{522b}$, $C_{524a}$ respectively. In this case, the pseudo force sense generation apparatus 5 periodically repeats rotation in the W1 direction and rotation in the opposite W2 direction (asymmetrical rotation), and also makes vibration that periodically repeats movement in the straight-line directions $C_{522b}$, $C_{524a}$ and movement in the opposite straight-line directions $C_{522a}$, $C_{524b}$. This makes the user gripping the external portions of the pseudo force sense generation apparatus 5 perceive rotational force sense as if the pseudo force sense generation apparatus 5 is rotating in the W1 direction as well as translational force sense as if the pseudo force sense generation apparatus 5 is moving in the straight-line directions $C_{522b}$, $C_{524a}$. Again, by positioning the center of a rotary motion at the center of gravity G or its vicinity, inertia moment around the rotation center can be minimized or reduced, achieving the same effect as the first embodiment.

Sixth Embodiment

Figure 9:
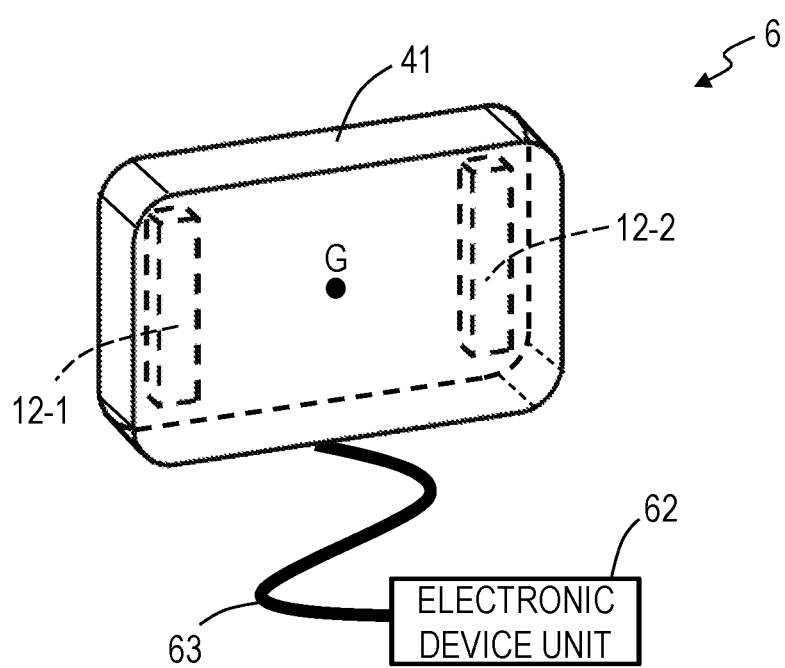
FIG. 9 is a conceptual view of the pseudo force sense generation apparatus in a sixth embodiment.

A sixth embodiment is a modification of the fourth embodiment and differs from it in that the relative position of the electronic device unit to the base is not fixed. As illustrated in FIG. 9, a pseudo force sense generation apparatus 6 in this embodiment has the base 41, vibrators 12-1, 12-2 that make asymmetrical motions where relative positions of the vibrators 12-1, 12-2 to the base 41 are fixed, an electronic device unit 62, and an electric cable 63. A difference from the fourth embodiment is that the electronic device unit is not attached inside the base 41 but the electronic device unit 62 is electrically connected to the base 41 via the electric cable 63. In this case, control of the vibrators 12-1, 12-2 is done by the electronic device unit 62. Control of the vibrators 12-1, 12-2 and the resulting presentation of rotational force sense are as described in the first and fourth embodiments. In this example, the center of gravity G of the system of the pseudo force sense generation apparatus 6 is positioned in a hollow region inside the base 41 between the vibrator 12-1 and the vibrator 12-2. The electronic device unit 62 is arranged outside the base 41. The base 41 and the vibrators 12-1, 12-2 are light in weight compared to the electronic device unit 62. Thus, clear pseudo force sense can be presented to the user gripping the external portions of the base 41.

[Other Modifications etc.]

Incidentally, the present invention is not limited to the above-described embodiments. For example, other devices may be employed as vibrators for presenting pseudo force sense. Also, multiple vibrators may be arranged in other configurations. n may be any integer of two or more, whether an even number or an odd number. Although the embodiments showed examples where n vibrators are arranged on the same plane, the vibrators may not be arranged on the same plane. For example, n vibrators may be arranged at positions on a surface of a virtual solid (for example, a sphere, a cube, a triangular prism, or a triangular pyramid) including a neighborhood of the center of gravity G. Each of the n vibrators vibrates in a direction along a straight line on the surface or in a direction along the tangent line to the surface to present translational force sense.

When the above-described processing of the electronic device unit is implemented by a computer, the processing details are described by a program. As a result of this program being executed by the computer, functions of the above-described processing are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

INDUSTRIAL APPLICABILITY

Exemplary fields of industrial application of the present invention include a steering wheel controller for a driving game. Feedback of rotational force sense may be presented to the present apparatus representing a steering wheel in response to the action of a car during a game, enabling the user to experience feeling close to that felt during real driving. In addition, the present invention may be utilized for an apparatus that navigates the user to a desired destination through rotational force sense.

DESCRIPTION OF REFERENCE NUMERALS 1 to 6 pseudo force sense generation apparatus

What is claimed is:

1. A pseudo force sense generation apparatus comprising:
a base;
first to nth vibrators that make asymmetrical motions where relative positions of the vibrators to the base are fixed; and
an electronic device having a fixed relative position to the base, wherein
an ith vibrator included in the first to the nth vibrators is each capable of presenting pseudo force sense in an ith straight-line direction, where n is an integer of two or more, and i=1, . . . n,
the ith straight-line direction is a straight-line direction along one of sides of a virtual polygon having three or more sides on a same plane,
the electronic device is arranged in a neighborhood of a center of gravity of a system which corresponds to a region surrounded by the first to the nth vibrators and that is away from the center of gravity at a distance equal to or less than a predetermined value,
mass per unit volume of the electronic device is greater than mass per unit volume of the base,
a weight distribution of the system is biased toward the neighborhood of the center of gravity of the system, and
the pseudo force sense generation apparatus makes a rotary motion centered at the neighborhood of the center of the gravity by driving of the vibrators.

2. The pseudo force sense generation apparatus according to claim 1, wherein a rotary motion energy of the pseudo force sense generation apparatus required for presenting rotational force sense by driving of the vibrators is smaller than a translational motion energy of the pseudo force sense generation apparatus required fori presenting translational force sense by driving of the vibrators.

3. The pseudo force sense generation apparatus according to claim 1, wherein
the base has a rotationally symmetrical structure, and
the vibrators are arranged in rotational symmetry to a rotation center of the rotary motion.

4. The pseudo force sense generation apparatus according to claim 1, wherein
the system includes the first to the nth vibrators.

5. The pseudo force sense generation apparatus according to claim 1, wherein the neighborhood of the center of gravity includes at least a power supply unit of the electronic device.

* * * * *